US008290158B2

(12) United States Patent
Ayaki et al.

(10) Patent No.: US 8,290,158 B2
(45) Date of Patent: Oct. 16, 2012

(54) AV DATA TRANSMISSION APPARATUS, AV DATA RECEPTION APPARATUS, AND AV DATA TRANSMISSION AND RECEPTION SYSTEM

(75) Inventors: Yasushi Ayaki, Osaka (JP); Takuya Nishimura, Osaka (JP); Kazunari Fujiwara, Osaka (JP)

(73) Assignee: Panasonic Corporation, Osaka (JP)

( * ) Notice: Subject to any disclaimer, the term of this patent is extended or adjusted under 35 U.S.C. 154(b) by 671 days.

(21) Appl. No.: 12/420,967

(22) Filed: Apr. 9, 2009

(65) Prior Publication Data

US 2009/0257587 A1 Oct. 15, 2009

(30) Foreign Application Priority Data

Apr. 11, 2008 (JP) .................................. 2008-103975

(51) Int. Cl.
*H04N 7/167* (2006.01)
(52) U.S. Cl. ........................................ 380/210; 380/230
(58) Field of Classification Search .................. 380/210, 380/230, 255, 212, 44; 713/189; 726/7
See application file for complete search history.

(56) References Cited

U.S. PATENT DOCUMENTS

| 8,098,388 | B2 | 1/2012 | Suzuki et al. |
| 2002/0002466 | A1 | 1/2002 | Kambayashi et al. |
| 2003/0004888 | A1 | 1/2003 | Kambayashi et al. |
| 2003/0101142 | A1 | 5/2003 | Kambayashi et al. |
| 2005/0289139 | A1 | 12/2005 | Takashima et al. |
| 2007/0091359 | A1 | 4/2007 | Suzuki et al. |
| 2007/0162753 | A1 | 7/2007 | Nakano et al. |
| 2007/0162981 | A1 | 7/2007 | Morioka et al. |
| 2008/0114992 | A1* | 5/2008 | Robert et al. .................. 713/193 |
| 2012/0096260 | A1 | 4/2012 | Suzuki et al. |

FOREIGN PATENT DOCUMENTS

| JP | 2005-328530 | 11/2005 |
| JP | 2006-040245 | 2/2006 |
| JP | 2007-104236 | 4/2007 |
| JP | 2007-272862 | 10/2007 |
| WO | 2005/057865 | 6/2005 |

OTHER PUBLICATIONS

Digital Transmission Content Protection Specification Revision 1.51 (Informational Version), pp. 1-82, Oct. 2007.

* cited by examiner

*Primary Examiner* — Samson Lemma
(74) *Attorney, Agent, or Firm* — Wenderoth, Lind & Ponack, L.L.P.

(57) ABSTRACT

An AV data transmission apparatus includes an encryption unit which encrypts AV data, an AV data transmission unit which transmits the encrypted AV data, a cipher-type-information switching unit which switches cipher type information indicating a cipher scheme used for the AV data, to other cipher type information, and a cipher-type-information transmission unit which transmits cipher type information. When transmitting AV data which is prohibited from being used in a reception apparatus that does not support new usage control information, the AV data transmission apparatus assigns different cipher type information, which is used to notify the reception apparatus, so that even the reception apparatus which cannot recognize the new usage control information can recognize its inability to perform decryption is due to new encryption performed by the AV data transmission apparatus.

6 Claims, 9 Drawing Sheets

| EMI value | Copy control information |
|---|---|
| $11_2$ | Copy Never |
| $10_2$ | Copy One Generation |
| $01_2$ | No More Copies |
| $00_2$ | Copy Free |

AV DATA TRANSMISSION APPARATUS, AV DATA RECEPTION APPARATUS, AND AV DATA TRANSMISSION AND RECEPTION SYSTEM

BACKGROUND OF THE INVENTION (1) Field of the Invention

The present invention relates to an AV data transmission apparatus, an AV data reception apparatus, and an AV data transmission and reception system, and particularly to an AV data transmission apparatus, an AV data reception apparatus, and an AV data transmission and reception system for encrypting AV data added with usage control information and transmitting the encrypted data.

(2) Description of the Related Art

In recent years, a home network that connects home appliances for sharing various contents is on the way to its implementation. Meanwhile, when handling data which is added with usage control information and requires copyright protection, such as newly released movies, pay-TV programs, and music, it is necessary to provide a processing unit that protects copyrights. An effective method for protecting copyrights is to encrypt data that requires copyright protection and to transmit the encrypted data, as well as protected usage control information of the data. This way, unauthorized use of the data is prevented.

A Digital Transmission Content Protection (DTCP) specification is an example of such a copyright protection specification in practical use.

In the DTCP specification, an AV data transmission apparatus and an AV data reception apparatus perform authentication and key exchange by an Authentication and Key Exchange (AKE) command so as to share an exchange key (Kx). The AV data transmission apparatus generates a content key (Kc) by using the exchange key (Kx), an encryption mode (EMI), and a key seed (Nc), and uses the content key as an encryption key. The AV data transmission apparatus encrypts AV data using the encryption key generated, and transmits the encrypted AV data.

Further, the AV data transmission apparatus stores the encryption mode (EMI) and the least significant bit of the key seed (Nc) in the header of a packet in which AV data is transmitted, and transmits the packet to the AV data reception apparatus. The key seed (Nc) itself is transmitted to the AV data reception apparatus by the AKE command.

The AV data reception apparatus generates a content key (Kc) by using the Kx shared through the authentication and key exchange, and the EMI and the Nc received from the AV data transmission apparatus, and uses the content key as a decryption key. The AV data reception apparatus performs decryption using the decryption key generated.

Further, it is necessary that the DTCP specification covers a cipher scheme in which the baseline cipher is specified as a cipher scheme. The DTCP specification covers an extended cipher scheme (optional cipher) for future extension. For future compatibility with the extended cipher scheme, cipher type information (Cipher_Algorithm) for selecting a cipher scheme is transmitted by an AKE command.

Figure 9:
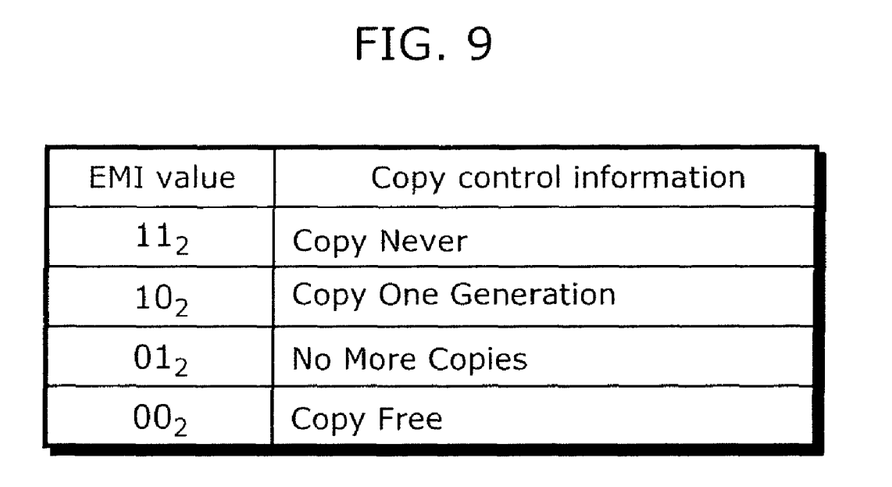
FIG. 9 is a table showing correspondence between EMI values and copy control information according to the DTCP specification.

Furthermore, the DTCP specification defines "Copy Free", "Copy One Generation", "No More Copies", and "Copy Never", as copy control information which is usage control information for copy generation management of AV data. The AV data transmission apparatus transmits usage control information in association with an encryption mode (EMI), and the AV data reception apparatus manages, as shown in FIG. 9, for example, data use (copy control) based on the encryption mode (EMI). FIG. 9 is a table showing correspondence between EMI values and copy control information according to the DTCP specification.

Further, information such as Image Constrain Token for restricting resolution is defined as usage control information which is followed when AV data received by the AV data reception apparatus is outputted as analog signals. The usage control information is stored in a DTCP descriptor (DTCP_descriptor) and embedded in the AV data so as to be transmitted (Non-Patent Reference 1: Digital Transmission Content Protection Specification Revision 1.51 (Informational Version)).

Further, with copyright protection specifications related to AV data transmission, when a new network distribution specification or a new recording medium is introduced, new usage control information is sometimes defined to be added to AV data for transmission. To transmit AV data added with new usage control information, however, it is necessary for apparatuses to be capable of transmitting the new usage control information as well as AV data. Here, new usage control information refers to an extended version of conventionally-defined usage control information.

Figure 10:
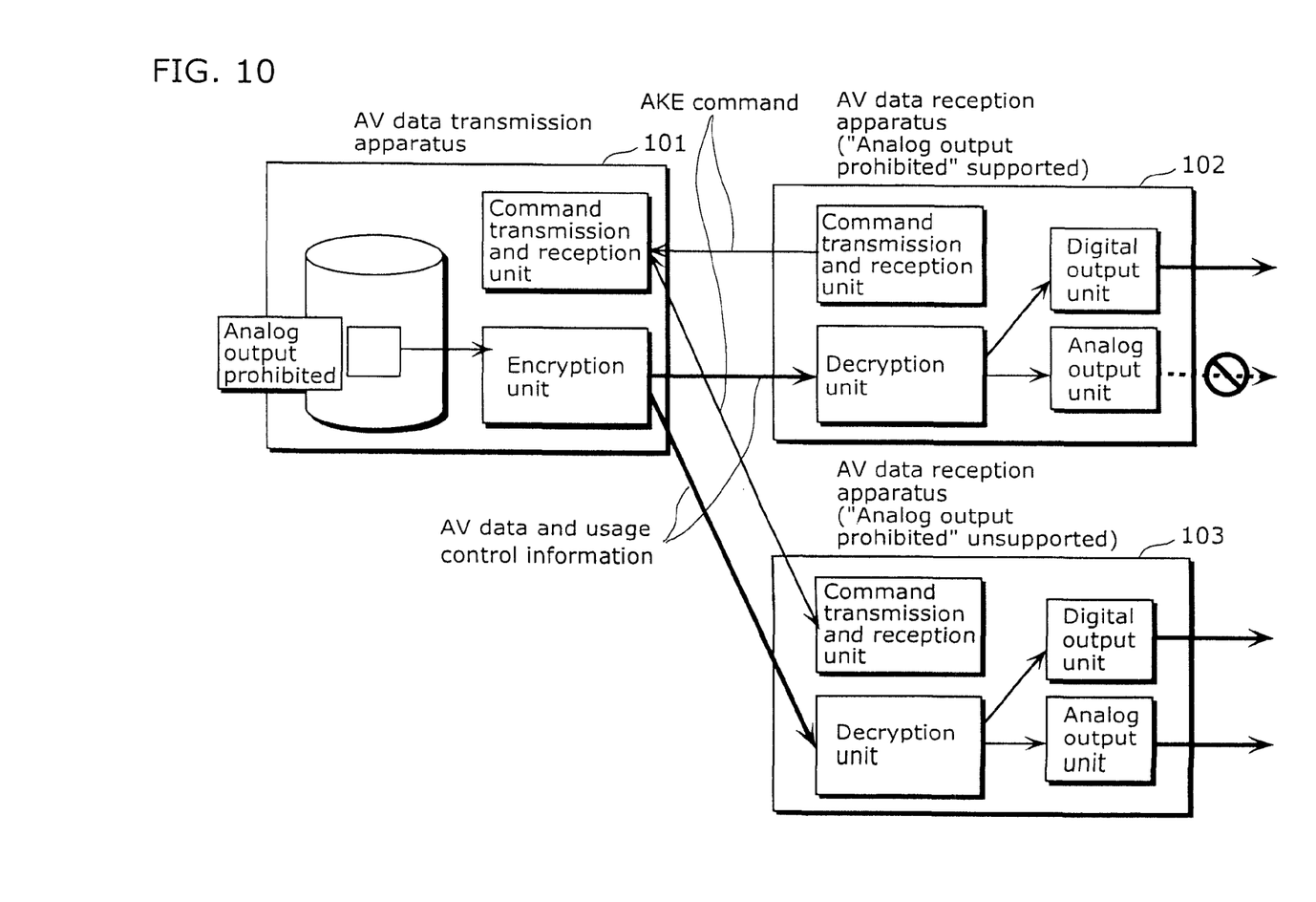
FIG. 10 illustrates transmission of various data between an AV data transmission apparatus that supports new usage control information and AV data reception apparatuses one of which supports new usage control information and the other of which does not support new usage control information, and operations of these apparatuses.

FIG. 10 illustrates transmission of various data between an AV data transmission apparatus that supports new usage control information and AV data reception apparatuses one of which supports new usage control information and the other of which does not support new usage control information. It also illustrates operations of these apparatuses. In FIG. 10, an AV data transmission apparatus 101 and an AV data reception apparatus 102 support new usage control information indicating "analog output prohibited", whereas an AV data reception apparatus 103 does not support the new usage control information indicating "analog output prohibited". FIG. 10 illustrates an example of an operating condition when various data is transmitted between the AV data transmission apparatus 101 and the AV data reception apparatuses 102 and 103.

With the DTCP specification, two methods are conventionally supported for transmitting usage control information, namely, a method of transmission using a DTCP descriptor and a method of transmission using an EMI. Therefore, it is expected that new usage control information will be transmitted by these methods.

As described, according to the transmission method using a DTCP descriptor, the AV data reception apparatus 102 supports new usage control information indicating "analog output prohibited", and is thus capable of stopping analog output. The AV data reception apparatus 103, however, cannot recognize the new usage control information indicating "analog output prohibited", and performs analog output without regard to the new usage control information. Thus, the new usage control information cannot achieve analog output control in the AV data reception apparatus 103.

As for the method using an EMI, since copy control information is already assigned to the four possible values to be taken by an EMI as shown in FIG. 9, it is necessary to add a new bit for assigning new usage control information indicating, for example, "analog output prohibited". In that case, the AV data reception apparatus 103 does not support the added new bit (extended EMI), and thus cannot decrypt AV data. In addition, the AV data reception apparatus 103 cannot recognize the meaning of the new bit and recognize that the reason for not being able to decrypt the AV data is that the AV data was encrypted by the AV data transmission apparatus 101 using the extended EMI. As a result, the user of the AV data reception apparatus 103 could falsely recognize the situation as a failure of the AV data transmission apparatus 101 or the AV data reception apparatus 103, a failure of the network apparatus, or a transmission error.

SUMMARY OF THE INVENTION

Therefore, the present invention has been conceived in view of the above circumstances, and an object of the present invention is to provide an AV data transmission apparatus, an AV data reception apparatus, and an AV data transmission and reception system for prohibiting use of AV data in an AV data reception apparatus that does not support new usage control information, and at the same time, allowing the user of the AV data reception apparatus, in which use of AV data is prohibited, to recognize that being unable to use the AV data is not due to a failure of the apparatuses or a transmission error.

In order to solve the above problems, the AV data transmission apparatus of the present invention is an AV data transmission apparatus which transmits, to AV data reception apparatuses, encrypted AV data and usage control information indicating a usage restriction, the AV data transmission apparatus comprising: an encryption unit configured to encrypt AV data; an AV data transmission unit configured to transmit the encrypted AV data; a cipher-type-information switching unit configured to switch cipher type information indicating a cipher scheme used for encrypting the AV data, to other cipher type information; and a cipher-type-information transmission unit configured to transmit cipher type information to the AV data reception apparatuses, wherein the encryption unit is configured to encrypt AV data under a first cipher scheme, the AV data being prohibited from being used in a first AV data reception apparatus that does not support predetermined usage control information and permitted to be used in a second AV data reception apparatus that supports the predetermined usage control information, the AV data transmission unit is configured to transmit the AV data encrypted under the first cipher scheme to the first AV data reception apparatus, and the cipher-type-information transmission unit is configured to transmit to the first AV data reception apparatus, the other cipher type information switched by the cipher-type-information switching unit, the other cipher type information indicating a second cipher scheme which differs from the first cipher scheme and does not allow the first AV data reception apparatus to perform decryption.

Further, in order to solve the above problems, the AV data reception apparatus of the present invention may be an AV data reception apparatus which receives from an AV data transmission apparatus, encrypted AV data and usage control information indicating a usage restriction, the AV data reception apparatus comprising: an AV data reception unit configured to receive the encrypted AV data; a decryption unit configured to decrypt the encrypted AV data; a cipher-type-information reception unit configured to receive cipher type information indicating a cipher scheme used for encrypting the AV data; and a decryption key switching unit configured to switch a decryption key to another decryption key generated under a decryption key generation scheme associated with the cipher type information, wherein, when the cipher-type-information reception unit receives cipher type information associated with predetermined usage control information indicating prohibition of use of the AV data in an AV data reception apparatus which does not support the predetermined usage control information, the decryption unit is configured to perform decryption under a cipher scheme indicated by the received cipher type information, using a decryption key generated under a decryption key generation scheme associated with the predetermined usage control information, based on the received cipher type information.

Furthermore, in order to solve the above problems, the AV data transmission and reception system of the present invention may be an AV data transmission and reception system comprising: at least one AV data reception apparatus which receives encrypted AV data; and an AV data transmission apparatus which transmits, to the at least one AV data reception apparatus, the encrypted AV data and usage control information indicating a usage restriction, wherein the AV data transmission apparatus comprises: an encryption unit configured to encrypt AV data; an AV data transmission unit configured to transmit the encrypted AV data; a cipher-type-information switching unit configured to switch cipher type information indicating a cipher scheme used for encrypting the AV data, to other cipher type information; and a cipher-type-information transmission unit configured to transmit cipher type information to the at least one AV data reception apparatus, wherein the encryption unit is configured to encrypt AV data under a first cipher scheme, the AV data being prohibited from being used in a first AV data reception apparatus that does not support predetermined usage control information and permitted to be used in a second AV data reception apparatus that supports the predetermined usage control information, the AV data transmission unit is configured to transmit the AV data encrypted under the first cipher scheme to the first AV data reception apparatus, and the cipher-type-information transmission unit is configured to transmit to the first AV data reception apparatus, the other cipher type information switched by the cipher-type-information switching unit, the other cipher type information indicating a second cipher scheme which differs from the first cipher scheme and does not allow the first AV data reception apparatus to perform decryption, and the at least one AV data reception apparatus comprises: an AV data reception unit configured to receive the encrypted AV data; a decryption unit configured to decrypt the encrypted AV data; a cipher-type-information reception unit configured to receive cipher type information indicating a cipher scheme used for encrypting the AV data; and a decryption key switching unit configured to switch a decryption key to another decryption key generated under a decryption key generation scheme associated with the cipher type information, wherein, when the cipher-type-information reception unit receives cipher type information associated with predetermined usage control information indicating prohibition of use of the AV data in an AV data reception apparatus which does not support the predetermined usage control information, the decryption unit is configured to perform decryption under a cipher scheme indicated by the received cipher type information, using a decryption key generated under a decryption key generation scheme associated with the predetermined usage control information, based on the received cipher type information.

The present invention provides an AV data transmission apparatus, an AV data reception apparatus, and an AV data transmission and reception system for prohibiting use of AV data in an AV data reception apparatus that does not support new usage control information, and at the same time, allowing the user of the AV data reception apparatus, in which use of AV data is prohibited, to recognize that being unable to use the AV data is due to new encryption performed by the AV data transmission apparatus, and not a failure of the apparatuses or a transmission error.

FURTHER INFORMATION ABOUT TECHNICAL BACKGROUND TO THIS APPLICATION

The disclosure of Japanese Patent Application No. 2008-103975 filed on Apr. 11, 2008 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the drawings.

DESCRIPTION OF THE PREFERRED EMBODIMENT(S)

Embodiment

<Structure of AV Data Transmission Apparatus>

Figure 1:
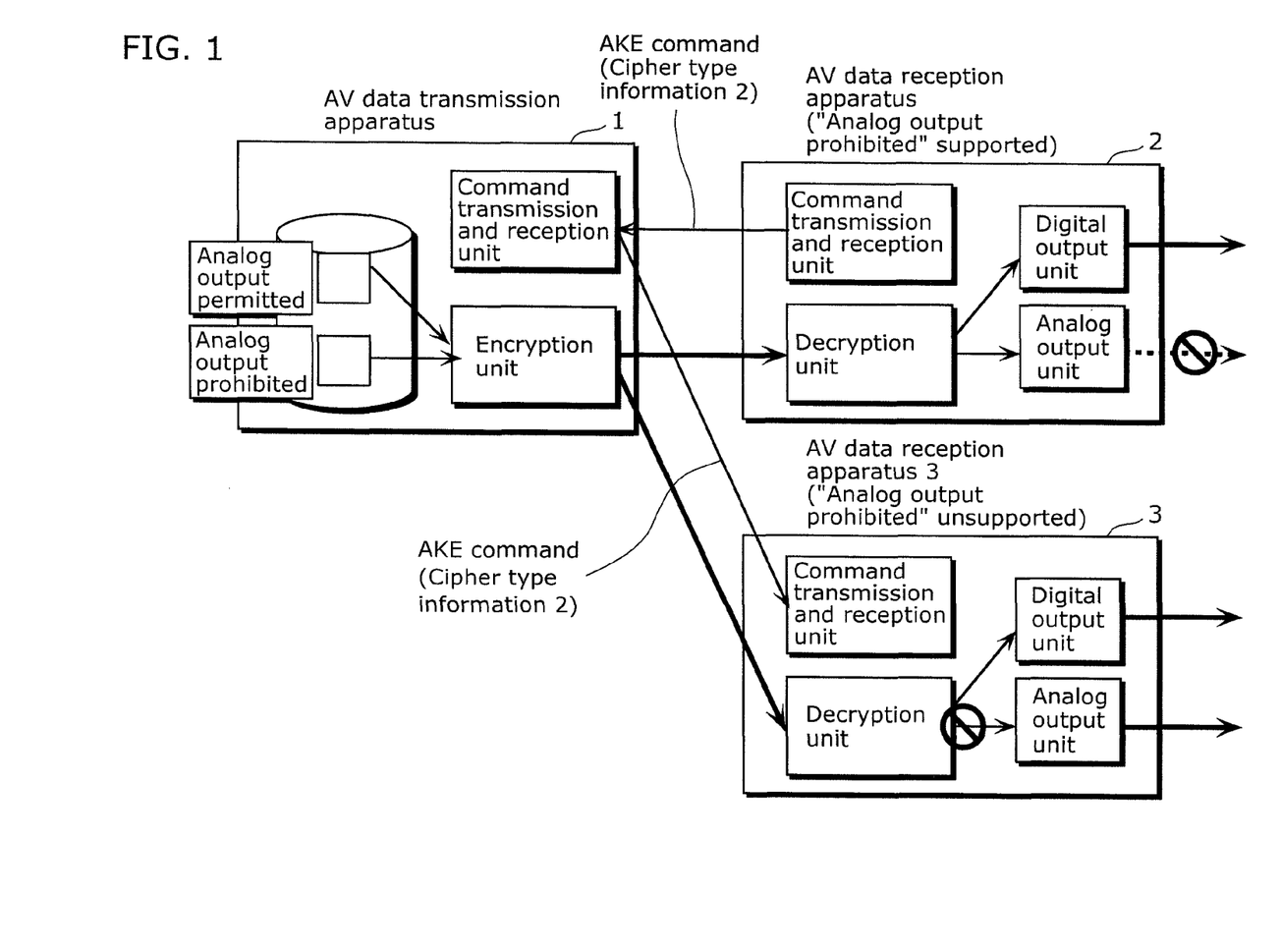
FIG. 1 illustrates a state where an AV data transmission apparatus of an embodiment of the present invention is connected with AV data reception apparatuses via a network.

FIG. 1 illustrates a state where an AV data transmission apparatus according to the present embodiment is connected with AV data reception apparatuses via a network.

In FIG. 1, an AV data transmission apparatus 1 is connected with AV data reception apparatuses 2 and 3 via a home network of IEEE 1394. The AV data transmission apparatus 1 reproduces AV data recorded on a Hard Disk Drive (HDD), encrypts the AV data, and transmits the encrypted AV data to the AV data reception apparatus 2 or 3.

Figure 2:
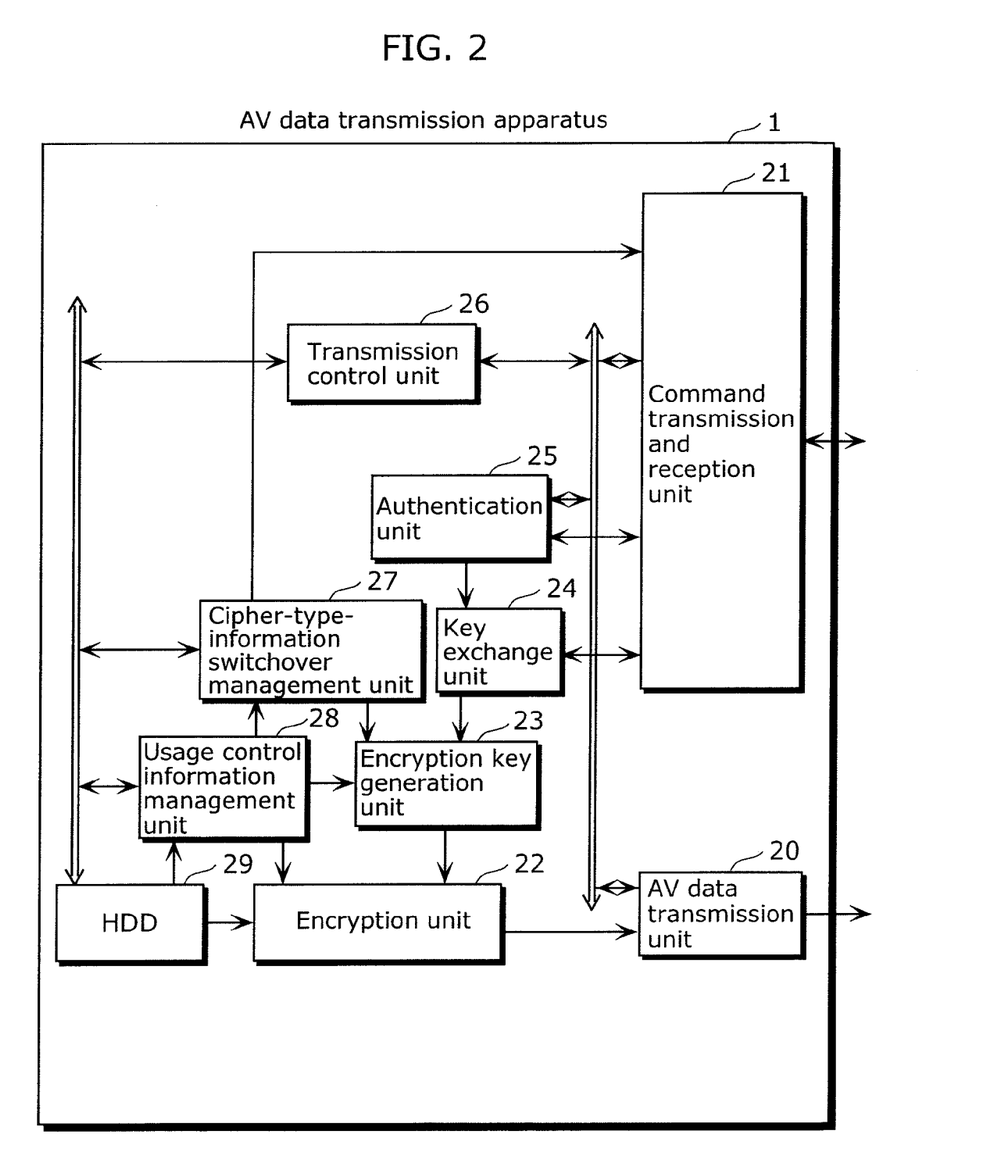
FIG. 2 illustrates the structure of an AV data transmission apparatus according to an embodiment of the present invention.

FIG. 2 illustrates the structure of the AV data transmission apparatus 1.

The AV data transmission apparatus 1 includes an AV data transmission unit 20, a command transmission and reception unit 21, an encryption unit 22, an encryption key generation unit 23, a key exchange unit 24, an authentication unit 25, a transmission control unit 26, a cipher-type-information switchover management unit 27, a usage control information management unit 28, and an HDD 29.

The AV data transmission unit 20 corresponds to the AV data transmission unit of the present invention, and is controlled by the transmission control unit 26. The AV data transmission unit 20 is a digital interface for transmission of AV data to the network.

The command transmission and reception unit 21 is a digital interface for transmission and reception of AKE commands and AKE command responses via the network.

The encryption unit 22 corresponds to the encryption unit of the present invention. The encryption unit 22 encrypts AV data reproduced from the HDD 29, using an encryption key (Kc) received from the encryption key generation unit 23, and packetizes the encrypted AV data. Further, the encryption unit 22 assigns, to the packetized AV data, a packet header in which an EMI and an Nc (least significant bit) received from the encryption key generation unit 23 are stored, and outputs the resulting AV data to the AV data transmission unit 20. Furthermore, the encryption unit 22 embeds usage control information received from the usage control information management unit 28 in the AV data by storing the usage control information in a DTCP descriptor.

Figure 3:
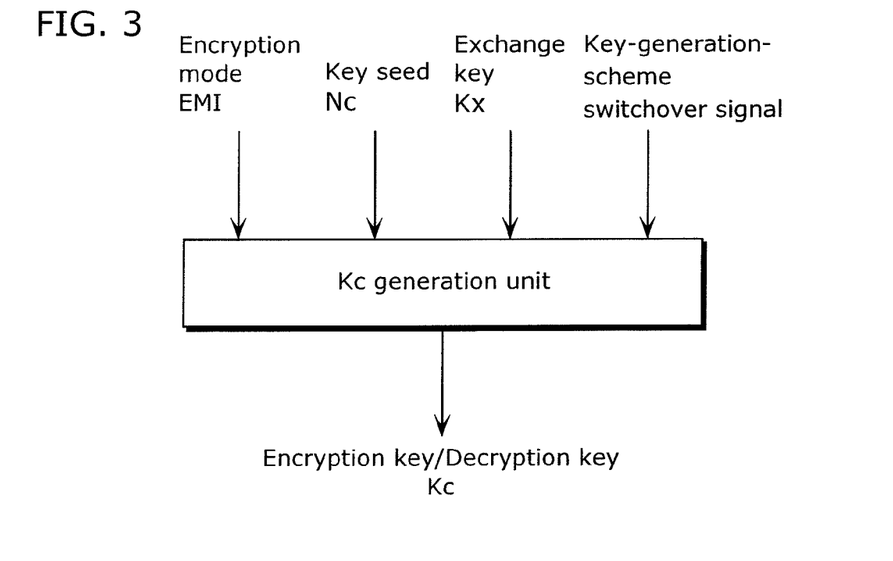
FIG. 3 illustrates information inputted to and outputted from a Kc generation unit of an encryption key generation unit according to an embodiment of the present invention.

The encryption key generation unit 23 is controlled by the transmission control unit 26, and includes a Kc generation unit. The encryption key generation unit 23 generates an encryption key via the Kc generation unit as shown in FIG. 3, by using: an exchange key (Kx) received from the key exchange unit 24; an encryption-key-generation-scheme switchover signal received from the cipher-type-information switchover management unit 27; an encryption mode (EMI) associated with copy control information received from the usage control information management unit 28; and a key seed (Nc) received from the transmission control unit 26. The encryption key generation unit 23 outputs the encryption key generated by the Kc generation unit to the encryption unit 22. Further, the encryption key generation unit 23 also outputs the EMI and Nc (least significant bit) assigned to the packet header to the encryption unit 22.

Here, FIG. 3 illustrates information inputted to and outputted from the Kc generation unit of the encryption key generation unit 23.

The key exchange unit 24 generates an exchange key (Kx) to be used by the AV data reception apparatus 2 or 3 for decrypting the encrypted AV data, encrypts the generated exchange key (Kx) using authentication information (Kauth) received from the authentication unit 25, and outputs the encrypted exchange key (Kx) via the command transmission and reception unit 21.

The authentication unit 25 is controlled by the transmission control unit 26, and executes authentication upon receiving an authentication start request command from the AV data reception apparatus 2 or 3, and shares authentication information (Kauth) with the AV data reception apparatus 2 or 3. The authentication unit 25 outputs the shared authentication information (Kauth) to the key exchange unit 24.

The transmission control unit 26 controls the AV data transmission unit 20, the command transmission and reception unit 21, the encryption key generation unit 23, the authentication unit 25, the cipher-type-information switchover management unit 27, the usage control information management unit 28, and the HDD 29 so that AV data is encrypted and transmitted.

The cipher-type-information switchover management unit 27 is controlled by the transmission control unit 26, and corresponds to the cipher-type-information switching unit, the encryption key switching unit, and the cipher-type-information transmission unit of the present invention. The cipher-type-information switchover management unit 27 outputs an encryption-key-generation-scheme switchover signal to the encryption key generation unit 23 when the usage control information received from the usage control information management unit 28 is new usage control information, that is, output control information indicating, for example, "analog output prohibited" to prohibit use of AV data in an apparatus that does not support the new usage control information. At the same time, the cipher-type-information switchover management unit 27 switches the cipher type information to a different one, and transmits the switched cipher type information to the AV data reception apparatus 2 or 3 via the command transmission and reception unit 21.

The usage control information management unit 28 is controlled by the transmission control unit 26, and generates an EMI based on usage control information received from the HDD 29, such as copy control information and output control information associated with AV data to be transmitted. The usage control information management unit 28 then outputs the EMI to the encryption key generation unit 23. Further, the usage control information management unit 28 outputs, to the cipher-type-information switchover management unit 27, new usage control information, which is output control information indicating "analog output prohibited", for example. It outputs the usage control information also to the encryption unit 22 to be stored in a DTCP descriptor.

The HDD 29 is a recording and reproduction unit that stores AV data and usage control information associated with the AV data, and is controlled by the transmission control unit 26. Further, the HDD 29 outputs AV data to the encryption unit 22, and outputs usage control information to the usage control information management unit 28.

Figure 4:
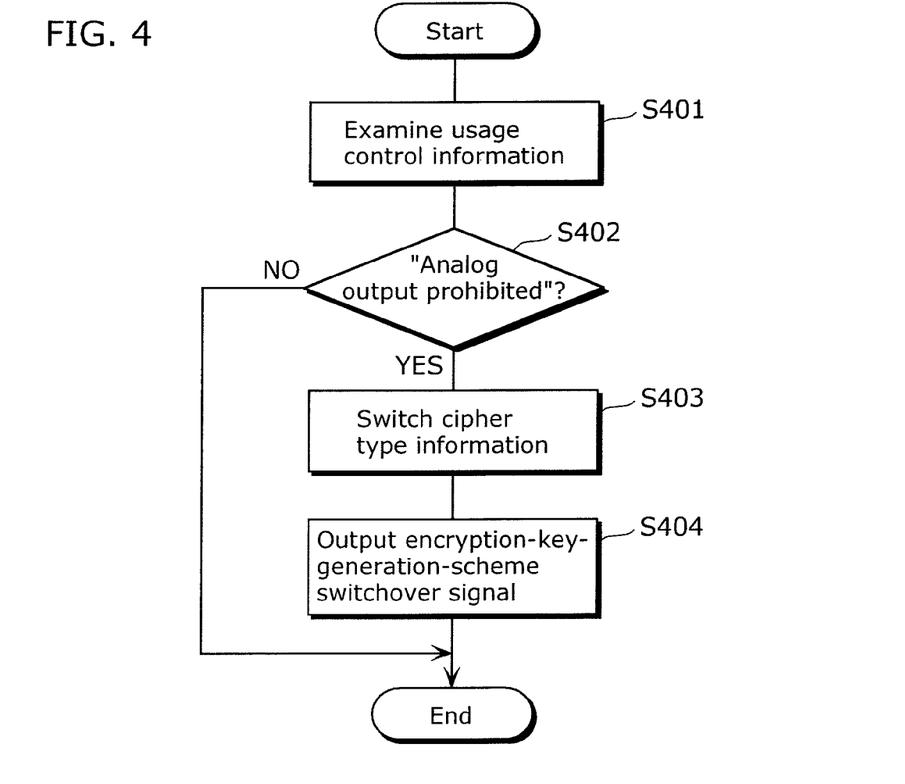
FIG. 4 is a flowchart illustrating a flow of processing for switching cipher type information to a different one, performed by a cipher-type-information switchover management unit of an embodiment of the present invention.

FIG. 4 is a flowchart illustrating a flow of processing for switching cipher type information to a different one, performed by the cipher-type-information switchover management unit 27.

The cipher-type-information switchover management unit 27 of the AV data transmission apparatus 1 examines usage control information received from the usage control information management unit 28 (S401) and determines whether or not the usage control information contains new usage control information indicating "analog output prohibited" for prohibiting use of AV data in an apparatus that does not support the new usage control information (S402). If the examined usage control information contains the new usage control information indicating "analog output prohibited" (YES in S402), the cipher-type-information switchover management unit 27 switches the cipher type information to one which is associated with the new usage control information indicating "analog output prohibited". For example, given that the cipher type information associated with "analog output permitted" is "cipher type 1" and that the cipher type information associated with "analog output prohibited" is "cipher type 2", the cipher-type-information switchover management unit 27 switches the cipher type information from "cipher type 1" to "cipher type 2".

The cipher-type-information switchover management unit 27 transmits the switched cipher type information via the command transmission and reception unit 21 (S403). Then, the cipher-type-information switchover management unit 27 outputs an encryption-key-generation-scheme switchover signal to the encryption key generation unit 23 (S404).

On the other hand, if the examined usage control information does not contain the new usage control information indicating "analog output prohibited" (NO in S402), the cipher-type-information switchover management unit 27 ends the processing.

In the manner as described, the cipher-type-information switchover management unit 27 switches the cipher type information to one which is associated with the new usage control information indicating "analog output prohibited". By using the cipher type information ("cipher type 2") associated with the new usage control information indicating "analog output prohibited", the AV data transmission apparatus 1 can prohibit use of AV data in an apparatus that does not support the new usage control information.

<Structure of AV Data Reception Apparatus>

Figure 5:
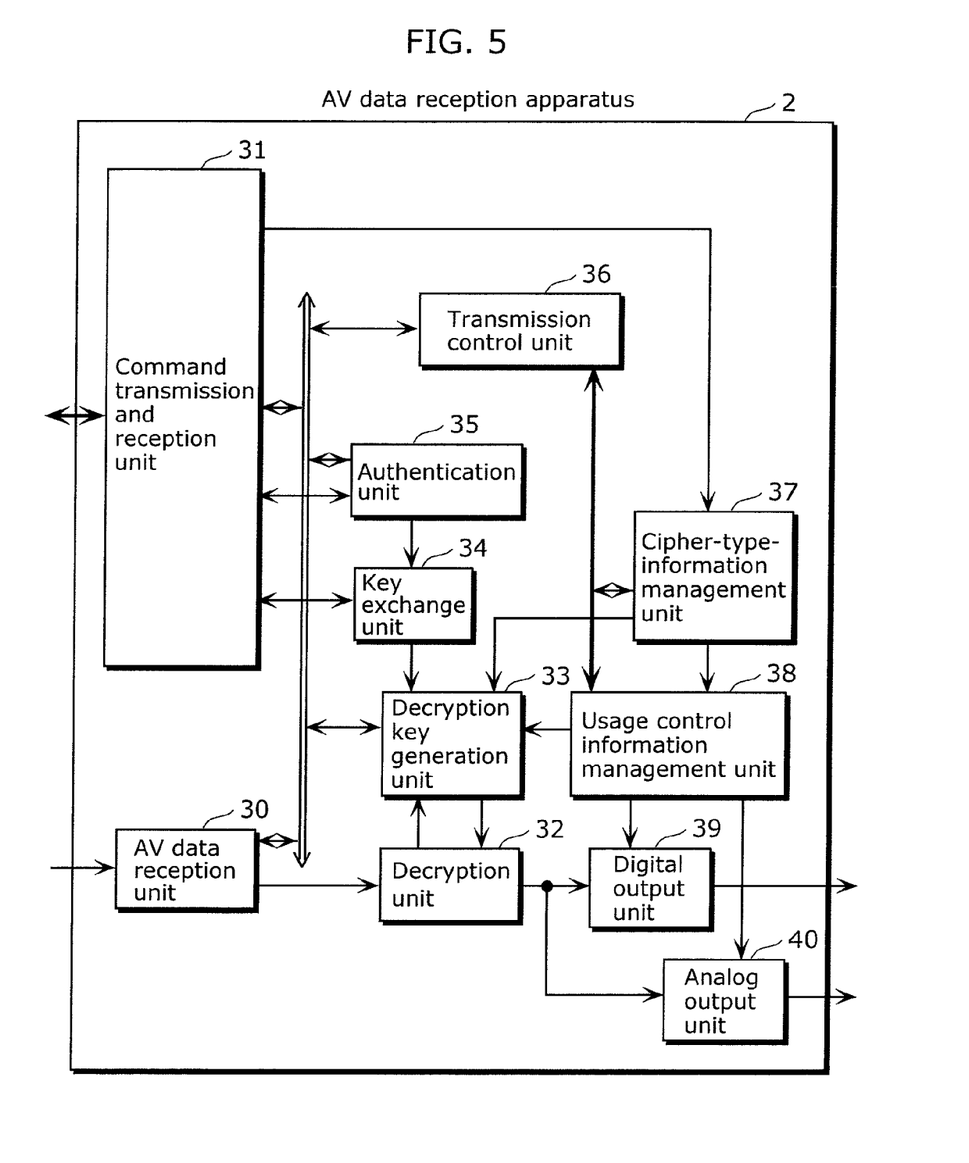
FIG. 5 illustrates the structure of an AV data reception apparatus according to an embodiment of the present invention.

FIG. 5 illustrates the structure of the AV data reception apparatus 2.

The AV data reception apparatus 2 includes an AV data reception unit 30, a command transmission and reception unit 31, a decryption unit 32, a decryption key generation unit 33, a key exchange unit 34, an authentication unit 35, a transmission control unit 36, a cipher-type-information management unit 37, a usage control information management unit 38, a digital output unit 39, and an analog output unit 40.

The AV data reception unit 30 corresponds to the AV data reception unit of the present invention, and is controlled by the transmission control unit 36. The AV data reception unit 30 is a digital interface for reception of AV data via the network.

The command transmission and reception unit 31 is a digital interface for transmission and reception of AKE commands and AKE command responses via the network.

The decryption unit 32 corresponds to the decryption unit of the present invention. The decryption unit 32 outputs, to the decryption key generation unit 33, an EMI and an Nc (least significant bit) stored in the packet header of an AV data packet received from the AV data reception unit 30. The decryption unit 32 decrypts AV data received from the AV data reception unit 30, using a decryption key (Kc) generated by the decryption key generation unit 33.

Further, the decryption unit 32 reads usage control information from a DTCP descriptor embedded in the decrypted AV data, and outputs it to the usage control information management unit 38.

The decryption key generation unit 33 is controlled by the transmission control unit 36, and includes a Kc generation unit. The decryption key generation unit 33 generates a decryption key via the Kc generation unit by using: an exchange key (Kx) received from the key exchange unit 34; a decryption-key-generation-scheme switchover signal received from the cipher-type-information management unit 37; copy control information (EMI) and an Nc (least significant bit) received from the decryption unit 32; and a key seed (Nc) received from the command transmission and reception unit 31. The decryption key generation unit 33 outputs the decryption key generated by the Kc generation unit to the decryption unit 32. It is to be noted that the Kc generation unit of the decryption key generation unit 33 has the same function as the Kc generation unit of the encryption key generation unit 23 shown in FIG. 3.

The key exchange unit 34 decrypts the encrypted exchange key received from the command transmission and reception unit 31, using authentication information (Kauth) received from the authentication unit 35, and outputs the decrypted exchange key to the decryption key generation unit 33.

The authentication unit 35 is controlled by the transmission control unit 36, transmits an authentication start request command to the AV data transmission apparatus 1 to execute authentication, and shares authentication information (Kauth) with the AV data transmission apparatus 1. The authentication unit 35 outputs the shared authentication information (Kauth) to the key exchange unit 34.

The transmission control unit 36 controls the AV data reception unit 30, the command transmission and reception unit 31, the decryption key generation unit 33, the authentication unit 35, the cipher-type-information management unit 37, the usage control information management unit 38, the digital output unit 39, and the analog output unit 40 so that AV data is received and decrypted, and the decrypted AV data is outputted via the digital output unit 39 or the analog output unit 40.

The cipher-type-information management unit 37 corresponds to the cipher-type-information reception unit and the decryption key switching unit of the present invention, and is controlled by the transmission control unit 36. The cipher-type-information management unit 37 examines cipher type information received from the command transmission and reception unit 31. When the examined cipher type information is associated with usage control information, the cipher-type-information management unit 37 outputs usage control information associated with the examined cipher type information to the usage control information management unit 38. Here, when the usage control information associated with the examined cipher type information is new usage control information indicating, for example, "analog output prohibited" for prohibiting use of AV data in an apparatus that does not support the new usage control information, the cipher-type-information management unit 37 outputs a decryption-key-generation-scheme switchover signal to the decryption key generation unit 33.

The usage control information management unit 38 is controlled by the transmission control unit 36, and controls the AV data output from the digital output unit 39 or the analog output unit 40 based on the usage control information received from the cipher-type-information management unit 37 and the decryption unit 32.

The digital output unit 39 is controlled by the usage control information management unit 38, and outputs, as digital signals, AV data received from the decryption unit 32.

The analog output unit 40 is controlled by the usage control information management unit 38, and outputs, as analog signals, AV data received from the decryption unit 32.

Figure 6:
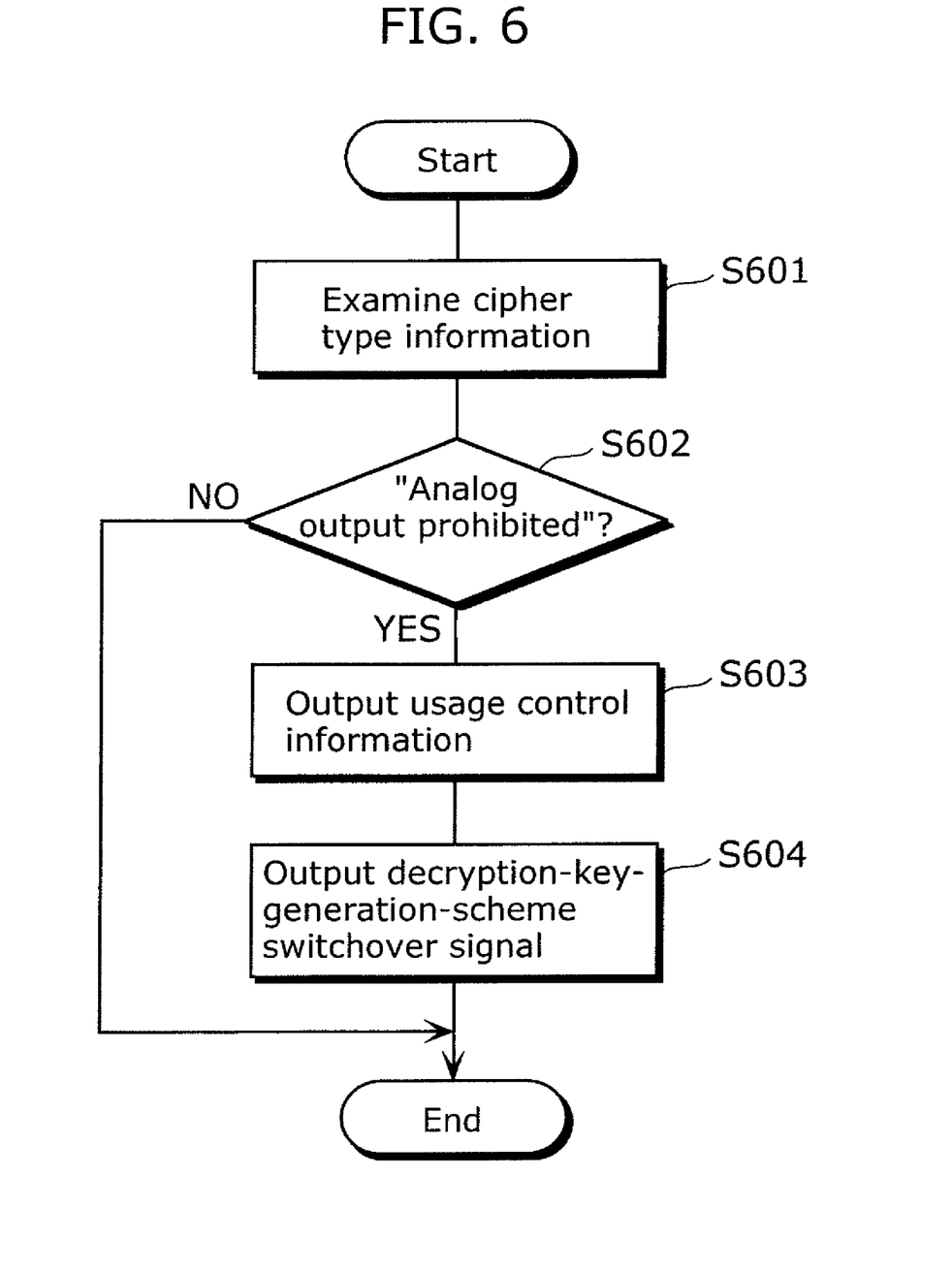
FIG. 6 is a flowchart illustrating a flow of processing performed by a cipher-type-information management unit of an embodiment of the present invention when an encryption key generation scheme is to be switched to a different one.

FIG. 6 is a flowchart illustrating a flow of processing performed by the cipher-type-information management unit 37 when an encryption key generation scheme is to be switched to a different one.

The cipher-type-information management unit 37 of the AV data reception apparatus 2 examines cipher type information received from the command transmission and reception unit 31 (S601). Next, the cipher-type-information management unit 37 verifies whether or not the cipher type information is associated with new usage control information indicating "analog output prohibited" for prohibiting use of AV data in an apparatus that does not support the new usage control information (S602). If the cipher type information is associated with the new usage control information indicating "analog output prohibited" (YES in S602), the cipher-type-information management unit 37 outputs, to the usage control information management unit 38, usage control information containing the new usage control information indicating "analog output prohibited". Then, the cipher-type-information management unit 37 outputs a decryption-key-generation-scheme switchover signal to the decryption key generation unit 33 (S604).

If the cipher type information is not associated with the new usage control information indicating "analog output prohibited" (NO in S602), the cipher-type-information management unit 37 ends the processing.

<Transmission to AV Data Reception Apparatus that Supports New Usage Control Information>

Next, the following describes an operation performed when the AV data transmission apparatus 1 of the present embodiment structured as above transmits AV data to the AV data reception apparatus 2 that supports new usage control information indicating "analog output prohibited".

Figure 7:
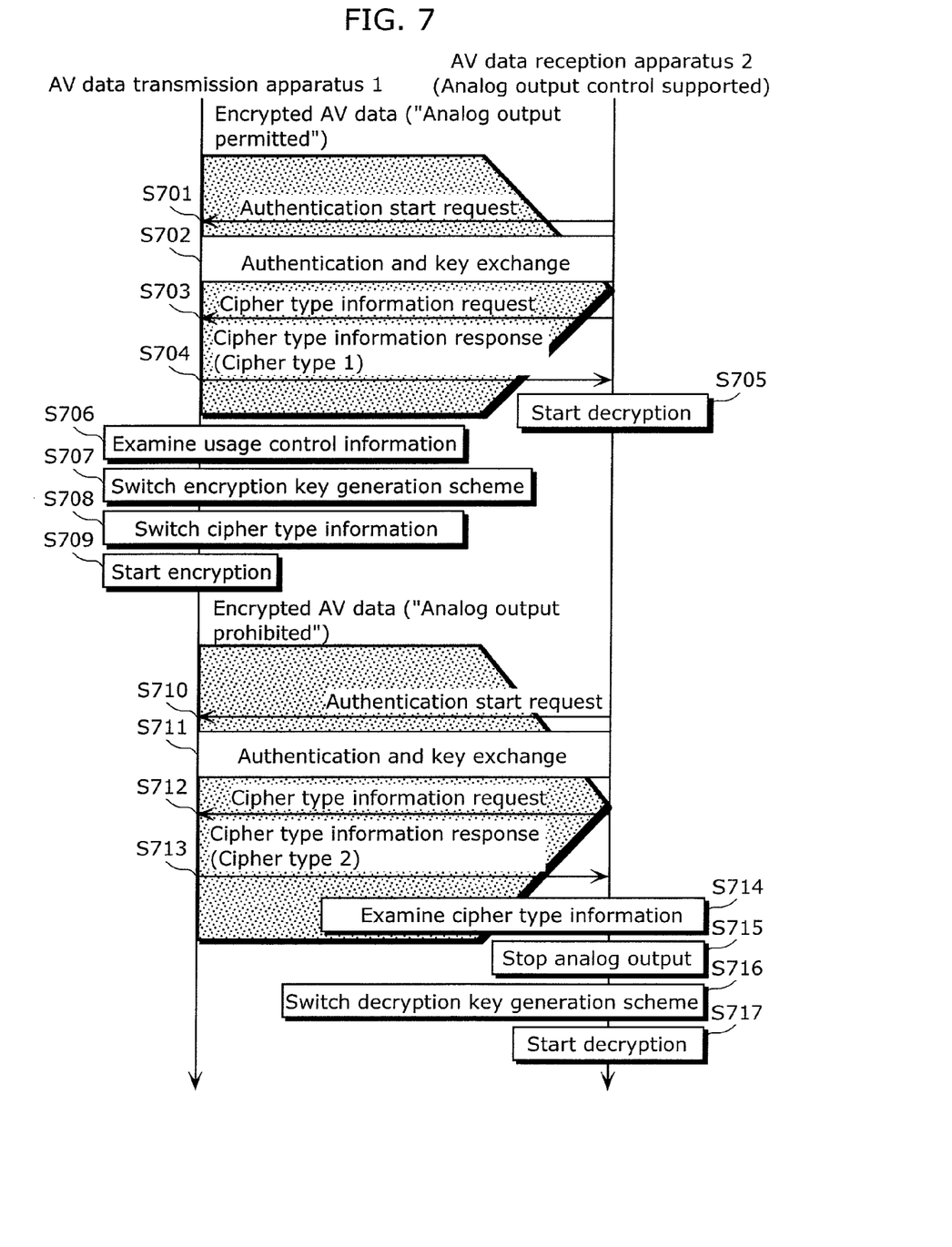
FIG. 7 illustrates an operation performed in AV data transmission between an AV data transmission apparatus and an AV data reception apparatus of an embodiment of the present invention when usage control information of AV data has been switched to a different one.

FIG. 7 illustrates an operation performed in AV data transmission between the AV data transmission apparatus 1 and the AV data reception apparatus 2 when usage control information of AV data has been switched from "analog output permitted" to "analog output prohibited".

Initially, the AV data transmission apparatus 1 encrypts AV data whose usage control information indicates "analog output permitted", by using an encryption key of an ordinary encryption key generation scheme "cipher type 1". Then, the AV data transmission apparatus 1 outputs the encrypted AV data to the AV data reception apparatus 2.

Upon receiving the encrypted AV data, the AV data reception apparatus 2 transmits an authentication start request command to the AV data transmission apparatus 1 (S701) to execute authentication and key exchange and share an exchange key with the AV data transmission apparatus 1 (S702). Subsequently, the AV data reception apparatus 2 transmits a cipher-type-information request command to the AV data transmission apparatus 1 (S703), obtains cipher type information by a command response from the AV data transmission apparatus 1 (S704), and generates a decryption key based on the obtained cipher type information to start decryption (S705).

Next, upon verifying that the usage control information of the AV data has been switched to "analog output prohibited" (S706), the AV data transmission apparatus 1 switches the encryption key generation scheme to a different one (S707). The AV data transmission apparatus 1 also switches the cipher type information from the value of "cipher type 1" to the value of "cipher type 2" that is associated with the new usage control information indicating "analog output prohibited" (S708). Then, the AV data transmission apparatus 1 starts encryption using an encryption key generated under the switched encryption key generation scheme (S709).

Next, the AV data reception apparatus 2 executes authentication and key exchange to share an exchange key (S710, S711). Then, the AV data reception apparatus 2 transmits a cipher-type-information request command to the AV data transmission apparatus 1 (S712), and obtains cipher type information through a command response from the AV data transmission apparatus 1 (S713).

The AV data reception apparatus 2 verifies that the obtained cipher type information indicates "cipher type 2" associated with the usage control information indicating "analog output prohibited" (S714), and then stops the analog output (S715). At the same time, the AV data reception apparatus 2 switches the decryption key generation scheme to one which corresponds to "cipher type 2", which has been switched from "cipher type 1", based on the obtained cipher type information (S716), and starts decryption using a decryption key generated under the switched decryption key generation scheme (S717).

In the manner as described, the AV data transmission apparatus 1 and the AV data reception apparatus 2 perform such processing as above when usage control information of AV data is switched from "analog output permitted" to "analog output prohibited".

<Transmission to AV Data Reception Apparatus that Does Not Support New Usage Control Information>

Next, the following describes an operation performed when the AV data transmission apparatus 1 of the present embodiment structured as above transmits AV data to the AV data reception apparatus 3 that does not support new usage control information indicating "analog output prohibited".

Figure 8:
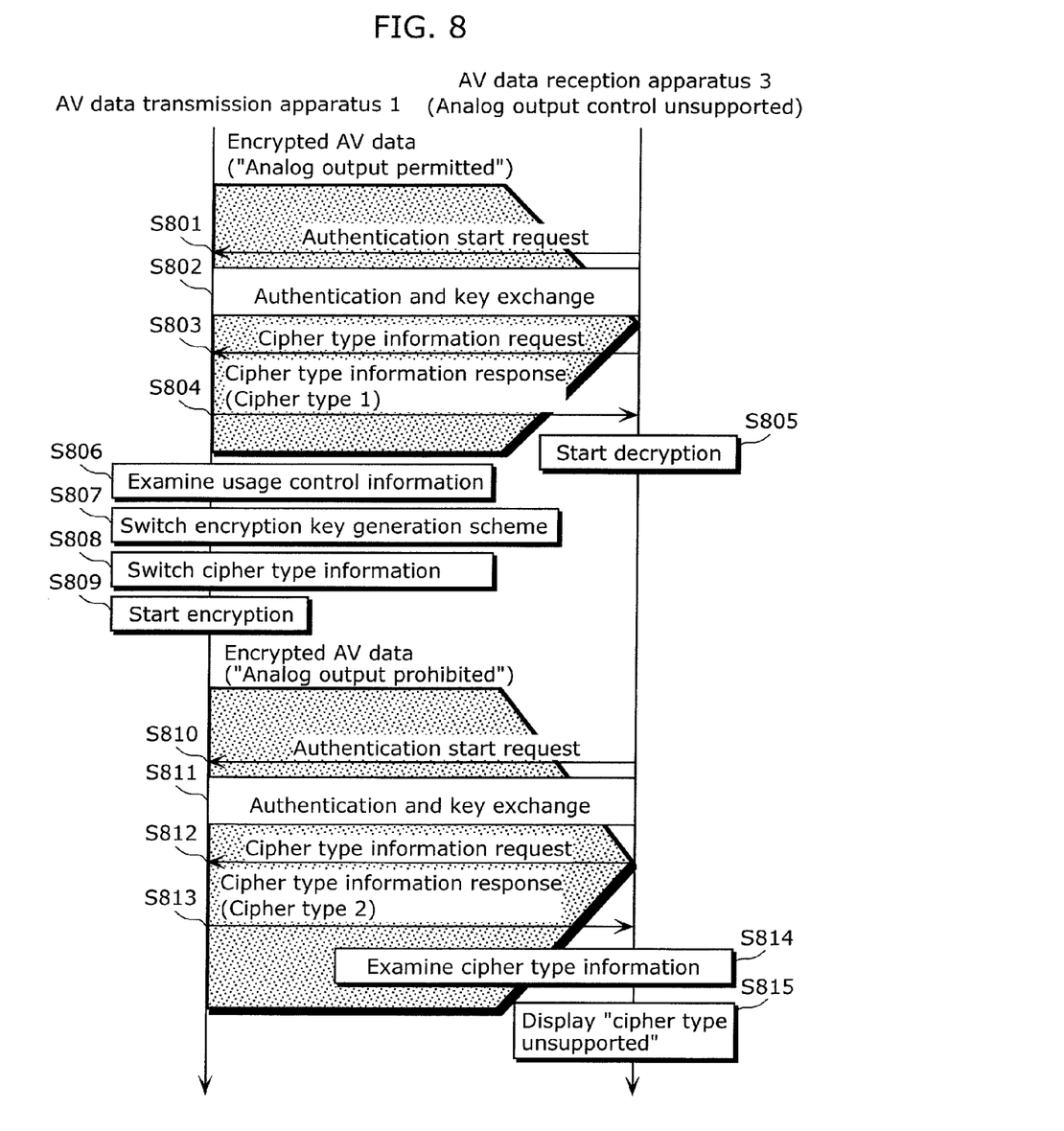
FIG. 8 illustrates an operation performed in AV data transmission between an AV data transmission apparatus and an existing AV data reception apparatus of an embodiment of the present invention when usage control information of AV data has been switched to a different one.

FIG. 8 illustrates an operation performed in AV data transmission between the AV data transmission apparatus 1 and the AV data reception apparatus 3 when usage control information of AV data has been switched from "analog output permitted" to "analog output prohibited".

Here, the operation for transmitting AV data whose usage control information indicates "analog output permitted" (S801 to S805) is the same as the operation S701 to S705 in FIG. 7, and thus the description thereof shall be omitted.

Furthermore, the operation S806 to S809 of the AV data transmission apparatus 1, performed when usage control information of AV data has been switched from "analog output permitted" to "analog output prohibited", is the same as the operation S706 to S709 in FIG. 7. That is, upon verifying that the usage control information of AV data has been switched from "analog output permitted" to "analog output prohibited" (S806), the AV data transmission apparatus 1 switches the encryption key generation scheme to a different one (S807). The AV data transmission apparatus 1 also switches the cipher type information from the value of "cipher type 1" to the value of "cipher type 2" that is associated with the new usage control information indicating "analog output prohibited" (S808), and starts encryption using an encryption key generated under the switched encryption key generation scheme (S809).

Next, the AV data reception apparatus 3 executes authentication and key exchange to share an exchange key (S810, S811).

Then, the AV data reception apparatus 3 transmits a cipher-type-information request command to the AV data transmission apparatus 1 (S812), and obtains cipher type information through a command response from the AV data transmission apparatus 1 (S813).

Here, since the AV data reception apparatus 3 does not support "cipher type 2" indicated by the received cipher type information, it displays "cipher type unsupported" and stops decryption (S815).

In the manner as described, the AV data transmission apparatus 1 and the AV data reception apparatus 3 perform such processing as above when the usage control information of AV data has been switched from "analog output permitted" to "analog output prohibited". To be more specific, use of AV data is prohibited in the AV data reception apparatus 3 that does not support the new usage control information. Furthermore, "cipher type unsupported" is displayed on the AV data reception apparatus 3 as the reason for not being able to use the AV data. This allows the user of the AV data reception apparatus 3 to recognize that being unable to use the AV data is due to the new encryption performed by the AV data transmission apparatus 1, and not a failure of the apparatuses or a transmission error.

As described, with the AV data transmission apparatus 1 and the AV data reception apparatuses 2 and 3 of the present embodiment, the usage control information that prohibits use of AV data in the AV data reception apparatus 3, which does not support the new usage control information, is transmitted in the form assigned to new cipher type information (here, "cipher type 2"). This allows the AV data transmission apparatus 1 and the AV data reception apparatus 2, which support new usage control information, to recognize the cipher type information received and to perform control over use of AV data. It also allows, at the same time, prohibition of use of the AV data in the existing AV data reception apparatus 3 which does not support the new usage control information (here, "cipher type 2").

Further, with the AV data transmission apparatus 1 and the AV data reception apparatuses 2 and 3, usage control information is transmitted in association with cipher type information. This allows the user of the AV data reception apparatus 3, in which AV data cannot be used, to recognize that being unable to use the AV data is due to the new encryption performed by the AV data transmission apparatus. Thus, the user can distinguish the situation from a failure of the apparatuses and a transmission error.

As described, the present invention provides the AV data transmission apparatus 1, the AV data reception apparatuses 2 and 3, and the AV data transmission and reception system that make it possible to prohibit use of AV data in the AV data reception apparatus 3 which does not support new usage control information, and at the same time, make it possible for the user of the AV data reception apparatus 3 to recognize that being unable to use the AV data is due to new encryption performed by the AV data transmission apparatus 1, and not a failure of the apparatuses or a transmission error.

The present embodiment has illustrated control information related to controlling analog output, as the usage control information that prohibits use of AV data in an apparatus that does not support new usage control information. It is to be noted, however, that the usage control information is not limited to the control information related to controlling analog output, as long as it is usage control information that prohibits use of AV data in an apparatus that does not support new usage control information. For example, other types of control information can be used such as copy control information, information controlling the number of times of reproduction, or information controlling a viewing time period.

Further, in the present embodiment, the AV data transmission apparatus 1 and the AV data reception apparatus 2 have a function of either transmission or reception, but it is apparent that they may have both functions of transmitting and receiving AV data.

Moreover, although in the present embodiment the cipher type information is transmitted by a command response, it may be transmitted by a command or in the form stored in the packet header of a data packet in which AV data is transmitted, as long as the AV data reception apparatus 3 supports the transmission method. Other methods can also be employed.

Further, the present embodiment has illustrated the case of employing IEEE 1394 as the home network, but the type of the home network is not limited to this, and a home network using Ethernet® or a wireless LAN may be adopted.

In addition, in the present embodiment, the AV data transmission apparatus 1 prohibits use of AV data in the AV data reception apparatus 3 by using "cipher type 2" which is not supported by the AV data reception apparatus 3 but which allows the AV data reception apparatus 3 to display that it is unsupported. In the case where it is possible for the AV data transmission apparatus 1 to prohibit the use of AV data in the data reception apparatus 3 by transmitting only "cipher type 2" to the AV data reception apparatus 3, the AV data transmission apparatus 1 does not need to transmit AV data encrypted using "cipher type 2" to the AV data reception apparatus 3.

Furthermore, the present invention can be embodied not only as apparatuses as described above, but also as integrated circuits having processing units of the apparatuses, a system that includes the apparatuses, and methods having steps of the processing units of the apparatuses.

Although only an exemplary embodiment of this invention has been described in detail above in relation to the AV data transmission apparatus, the AV data reception apparatus, and the AV data transmission and reception system of the present invention, the present invention is not limited this exemplary embodiment. Those skilled in the art will readily appreciate that many modifications are possible in the exemplary embodiment without materially departing from the novel teachings and advantages of this invention. Accordingly, all such modifications are intended to be included within the scope of this invention.

INDUSTRIAL APPLICABILITY

The present invention is applicable to an AV data transmission apparatus, an AV data reception apparatus, and an AV data transmission and reception system, and particularly to an AV data transmission apparatus which transmits encrypted AV data added with usage control information and an AV data reception apparatus which receives the encrypted AV data.

What is claimed is:

1. An AV data transmission apparatus for transmitting, to AV data reception apparatuses, usage control information indicating a usage restriction, and AV data in which the usage control information is embedded, said AV data transmission apparatus comprising:
a circuit;
an encryption unit configured to encrypt AV data;
an AV data transmission unit configured to transmit the encrypted AV data;
a cipher-type-information switching unit configured to switch between cipher type information indicating cipher schemes used for encrypting the AV data; and
a cipher-type-information transmission unit configured to transmit the cipher type information to the AV data reception apparatuses, wherein
when first usage control information is switched to second usage control information, said cipher-type-information switching unit is configured to switch from first cipher type information corresponding to the first usage control information to second cipher type information corresponding to the second usage control information and indicating a second cipher scheme different from a first cipher scheme, the first usage control information corresponding to a first AV data reception apparatus and a second AV data reception apparatus that are included in the AV data reception apparatuses, the second usage control information corresponding to the second AV data reception apparatus and not the first AV data reception apparatus, and the first and second cipher schemes each being used for encrypting the AV data,
said encryption unit is configured to encrypt the AV data under the second cipher scheme,
said cipher-type-information transmission unit is configured to transmit the second cipher type information to the first AV data reception apparatus and the second AV data reception apparatus,
said AV data transmission unit is configured to transmit the encrypted AV data encrypted under the second cipher scheme to the first AV data reception apparatus and the second AV data reception apparatus,
the first AV data reception apparatus is permitted to use AV data in which the first usage control information is embedded and is capable of decrypting AV data encrypted under the first cipher scheme, and the first AV data reception apparatus is prohibited from using AV data in which the second usage control information is embedded and is incapable of decrypting AV data encrypted under the second cipher scheme, and
the second AV data reception apparatus is permitted to use AV data in which the first or second usage control information is embedded and is capable of decrypting AV data encrypted under the first cipher scheme and AV data encrypted under the second cipher scheme.

2. The AV data transmission apparatus according to claim 1, further comprising
an encryption key switching unit configured to switch an encryption key to be used when said encryption unit encrypts the AV data,
wherein, when the first usage control information is switched to the second usage control information, said encryption unit is configured to encrypt the AV data in which the second usage control information is embedded, by using an encryption key generated using an encryption key generation scheme different from an encryption key generation scheme used to generate an encryption key used for encrypting the AV data in which the first usage control information is embedded.

3. The AV data transmission apparatus according to claim 1,
wherein, when the first usage control information is switched to the second usage control information, said cipher-type-information switching unit is configured to switch from the first cipher type information to the second cipher type information, by assigning unique cipher type information indicating prohibition of use of the AV data in the first AV data reception apparatus, to the second usage control information.

4. The AV data transmission apparatus according to claim 1,
wherein, when the first usage control information is switched to the second usage control information, said cipher-type-information switching unit is configured to switch from the first cipher type information to the second cipher type information, by assigning a value provided for an extended cipher scheme, to the second usage control information.

5. An AV data reception apparatus for receiving from an AV data transmission apparatus usage control information indicating a usage restriction, and encrypted AV data in which the usage control information is embedded, said AV data reception apparatus comprising:
a circuit;
an AV data reception unit configured to receive the encrypted AV data;
a decryption unit configured to decrypt the encrypted AV data;
a cipher-type-information reception unit configured to receive cipher type information indicating a cipher scheme used for encrypting the AV data; and a decryption key switching unit configured to switch to a decryption key generated under a decryption key generation scheme associated with the cipher type information, wherein said AV data reception apparatus corresponding to first usage control information indicating a usage restriction is permitted to use AV data in which the first usage control information is embedded and is capable of decrypting AV data encrypted under a first encryption scheme corresponding to the first usage control information, and said AV data reception apparatus not corresponding to second usage control information indicating a usage restriction is prohibited from using AV data in which the second usage control information is embedded and is incapable of decrypting AV data encrypted under a second encryption scheme different from the first encryption scheme, and when said cipher-type-information reception unit receives cipher type information corresponding to the second usage control information, said decryption unit is prohibited from using the AV data in which the second usage control information is embedded, by being incapable of (i) generating from the received cipher type information a decryption key corresponding to the second usage control information and (ii) obtaining from the second usage control information an encryption scheme indicated by the cipher type information.

6. An AV data transmission and reception system comprising:

at least one AV data reception apparatus for receiving encrypted AV data; and an AV data transmission apparatus for transmitting, to a plurality of AV reception apparatuses including said at least one AV data reception apparatus, usage control information indicating a usage restriction, and encrypted AV data in which the usage control information is embedded, wherein said AV data transmission apparatus comprises:
a circuit;
an encryption unit configured to encrypt AV data;
an AV data transmission unit configured to transmit the encrypted AV data;
a cipher-type-information switching unit configured to switch between cipher type information indicating cipher schemes used for encrypting the AV data, to other cipher type information; and
a cipher-type-information transmission unit configured to transmit the cipher type information to the AV data reception apparatuses including said at least one AV data reception apparatus, wherein
when first usage control information is switched to second usage control information, said cipher-type-information switching unit is configured to switch from first cipher type information corresponding to the first usage control information to second cipher type information corresponding to the second usage control information and indicating a second cipher scheme different from a first cipher scheme, the first usage control information corresponding to said at least one AV data reception apparatus and a second AV data reception apparatus that are included in the AV data reception apparatuses, the second usage control information corresponding to the second AV data reception apparatus and not said at least one AV data reception apparatus, and the first and second cipher schemes each being used for encrypting the AV data, said encryption unit is configured to encrypt the AV data under the second cipher scheme, said cipher-type-information transmission unit is configured to transmit the second cipher type information to said at least one AV data reception apparatus and the second AV data reception apparatus, said AV data transmission unit is configured to transmit the encrypted AV data encrypted under the second cipher scheme to said at least one AV data reception apparatus and the second AV data reception apparatus, and said at least one AV data reception apparatus is permitted to use AV data in which the first usage control information is embedded and is capable of decrypting AV data encrypted under the first cipher scheme, and said at least one AV data reception apparatus is prohibited from using AV data in which the second usage control information is embedded and is incapable of decrypting AV data encrypted under the second cipher scheme, and the second AV data reception apparatus is permitted to use the AV data in which the first or second usage control information is embedded and is capable of decrypting AV data encrypted under the first cipher scheme and the AV data encrypted under the second cipher scheme, and said at least one AV data reception apparatus comprises:
an AV data reception unit configured to receive the encrypted AV data;
a decryption unit configured to decrypt the encrypted AV data;
a cipher-type-information reception unit configured to receive the cipher type information indicating a cipher scheme used for encrypting the AV data; and
a decryption key switching unit configured to switch to a decryption key generated under a decryption key generation scheme associated with the cipher type information, wherein said at least one AV data reception apparatus corresponding to the first usage control information indicating a usage restriction is permitted to use the AV data in which the first usage control information is embedded and is capable of decrypting the AV data encrypted under a first encryption scheme corresponding to the first usage control information, and said at least one AV data reception apparatus not corresponding to the second usage control information indicating a usage restriction is prohibited from using the AV data in which the second usage control information is embedded and is incapable of decrypting the AV data encrypted under a second encryption scheme different from the first encryption scheme, and when said cipher-type-information reception unit receives the second cipher type information corresponding to the second usage control information, said decryption unit is prohibited from using the AV data in which the second usage control information is embedded, by being incapable of (i) generating from the received second cipher type information a decryption key corresponding to the second usage control information and (ii) obtaining from the second usage control information the second encryption scheme indicated by the second cipher type information.

* * * * *